United States Patent
Zhong et al.

(10) Patent No.: US 11,502,588 B2
(45) Date of Patent: Nov. 15, 2022

(54) MANUFACTURE OF A POLYMERIC ELECTRICAL MACHINE

(71) Applicant: ABB Schweiz AG, Baden (CH)

(72) Inventors: Sheng Zhong, Hillsborough, NC (US); Dariusz Bednarowski, Cracow (PL); Colin E. Tschida, Durham, NC (US); Darren Tremelling, Apex, NC (US); Lukasz Malinowski, Cracow (PL)

(73) Assignee: ABB Schweiz AG, Baden (CH)

( * ) Notice: Subject to any disclaimer, the term of this patent is extended or adjusted under 35 U.S.C. 154(b) by 872 days.

(21) Appl. No.: 16/231,102

(22) Filed: Dec. 21, 2018

(65) Prior Publication Data
US 2020/0204049 A1   Jun. 25, 2020

(51) Int. Cl.
*H02K 15/12* (2006.01)
*H02K 15/02* (2006.01)
(Continued)

(52) U.S. Cl.
CPC ............ *H02K 15/12* (2013.01); *H02K 1/18* (2013.01); *H02K 5/15* (2013.01); *H02K 15/02* (2013.01);
(Continued)

(58) Field of Classification Search
CPC ...... H02K 15/02; H02K 15/028; H02K 15/12; H02K 15/14; H02K 1/18; H02K 5/08;
(Continued)

(56) References Cited

U.S. PATENT DOCUMENTS 4,631,433 A * 12/1986 Stokes ............... H02K 5/15
                                                              310/43
5,694,268 A    12/1997 Dunfield et al.
(Continued)

FOREIGN PATENT DOCUMENTS

CN    202178625 U    3/2012
CN    203660852 U    6/2014
(Continued)

OTHER PUBLICATIONS

Extended European Search Report, EP Appln. No. 19218203.8, dated Apr. 24, 2020, 16 pgs.
(Continued)

*Primary Examiner* — A. Dexter Tugbang
(74) *Attorney, Agent, or Firm* — Leydig, Voit & Mayer, Ltd.

(57) ABSTRACT

A method for manufacturing a polymeric electrical machine includes manufacturing a stator including a laminated stator core and a plurality of windings including winding overhangs; applying a surface treatment to the stator core constructed to reduce defects at an interface between a polymeric material and the stator core and enhance adherence between the polymeric material and the stator core; mounting the stator onto a mandrel; inserting the stator into an electrical machine housing mold; molding an electrical machine housing including a stator band with an integral non-drive end endplate, including overmolding the stator and winding overhangs within the stator band; molding a drive end endplate, including forming polymeric ribs in the drive end endplate and overmolding a metallic structure into the endplate, the metallic structure enhancing mechanical stiffness of the endplate; installing a rotor assembly into the electrical machine housing; and installing the endplate onto the electrical machine housing.

14 Claims, 13 Drawing Sheets

(51) Int. Cl.
*H02K 1/18* (2006.01)
*H02K 5/15* (2006.01)
*H02K 15/14* (2006.01)
*H02K 5/08* (2006.01)

(52) U.S. Cl.
CPC ........... *H02K 15/028* (2013.01); *H02K 15/14* (2013.01); *H02K 5/08* (2013.01); *Y10T 29/49009* (2015.01); *Y10T 29/49012* (2015.01)

(58) Field of Classification Search
CPC ................ H02K 5/15; Y10T 29/49009; Y10T 29/49012
See application file for complete search history.

(56) References Cited

U.S. PATENT DOCUMENTS

| | | |
|---|---|---|
| 6,404,086 B1 | 6/2002 | Fukasaku et al. |
| 6,903,475 B2 | 6/2005 | Ortt et al. |
| 7,036,206 B2 | 5/2006 | Worden et al. |
| 8,283,827 B2 | 10/2012 | Jones et al. |
| 2002/0104909 A1 | 8/2002 | Strutz |
| 2004/0104636 A1 | 6/2004 | Ortt et al. |
| 2006/0220474 A1 | 10/2006 | Yoshida |
| 2014/0333158 A1* | 11/2014 | Tamaki .................. H02K 15/12 310/43 |
| 2014/0341759 A1 | 11/2014 | Calico et al. |
| 2017/0063190 A1 | 3/2017 | Hanni et al. |
| 2017/0373545 A1 | 12/2017 | Zhong et al. |
| 2018/0205283 A1 | 7/2018 | Mauch et al. |

FOREIGN PATENT DOCUMENTS

| | | |
|---|---|---|
| EP | 0626747 | 11/1994 |
| EP | 0819332 | 1/1998 |
| EP | 2357719 | 8/2011 |
| GB | 2518208 | 3/2015 |
| JP | 2014118950 A * | 6/2014 |
| WO | 2010135922 A1 | 12/2010 |
| WO | 2014198684 | 12/2014 |
| WO | 2018005348 | 1/2018 |

OTHER PUBLICATIONS

Nidec Corporation, "Resin-packed motors," Copyright Nidec Corporation 1995-2014. Available: http://www.nidec.com/en-Global/technology/story/resin_pack_motor?prt=1 (3 pages).

* cited by examiner

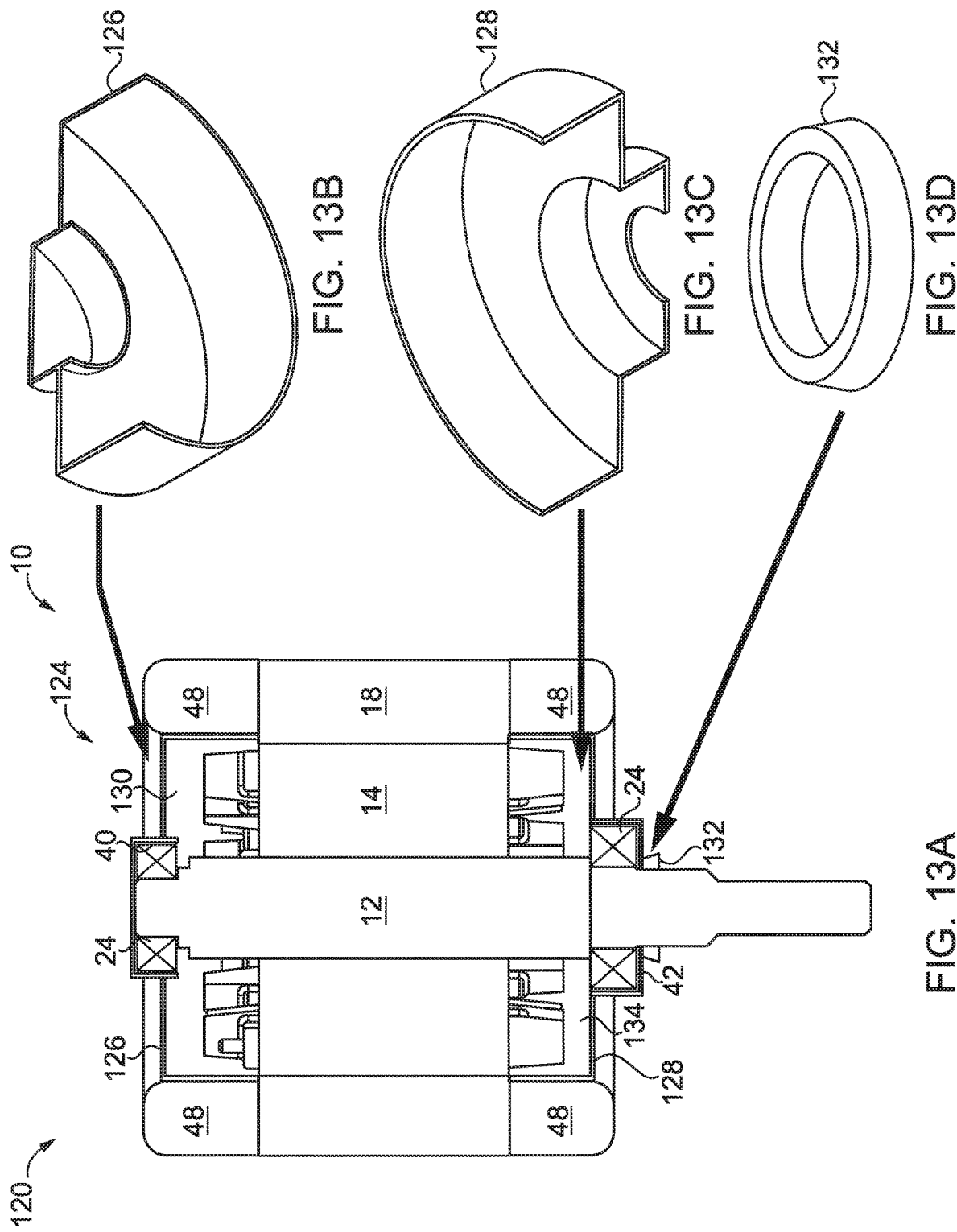

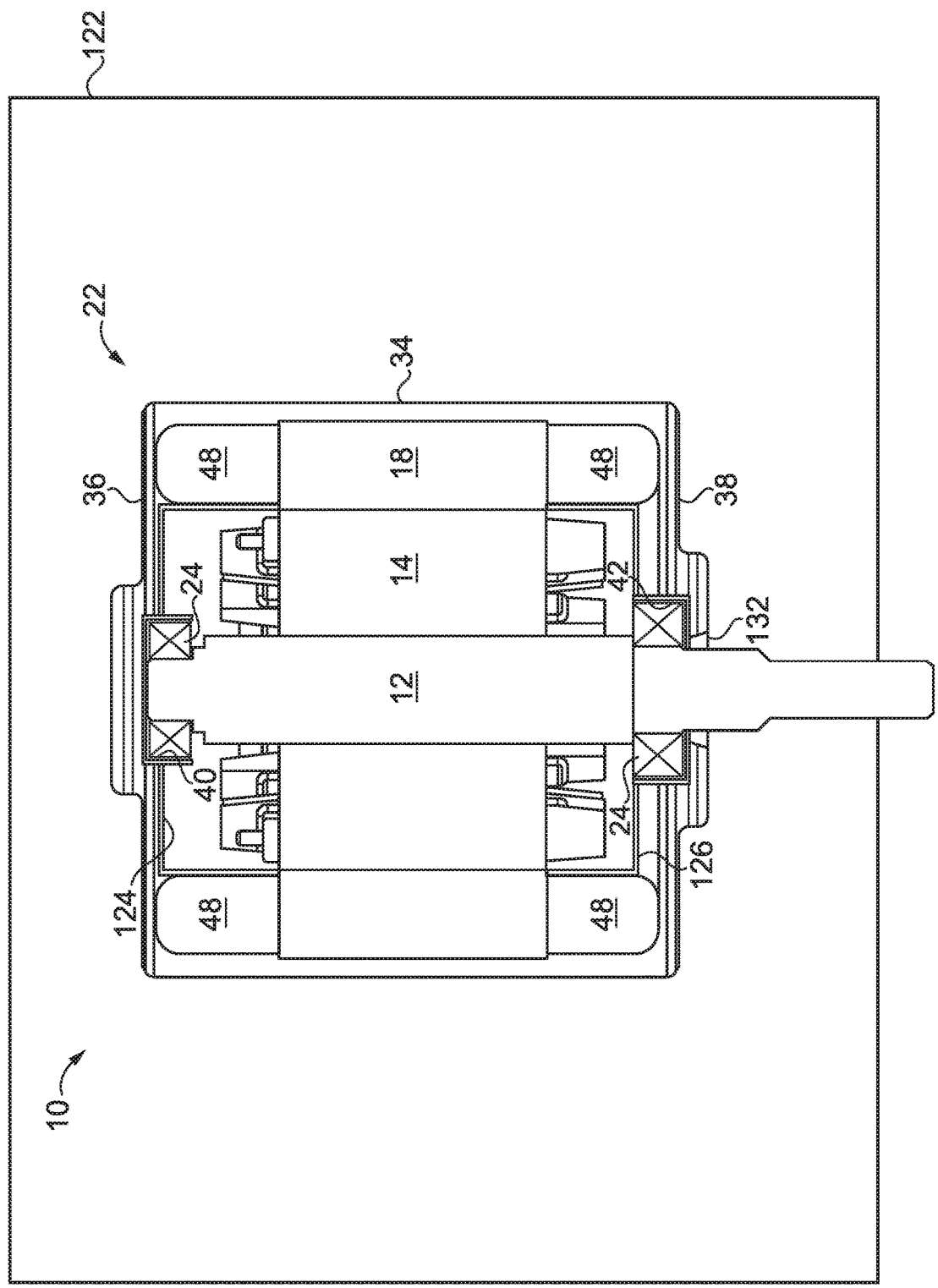

MANUFACTURE OF A POLYMERIC ELECTRICAL MACHINE

TECHNICAL FIELD

The present application relates generally to electrical machines and more particularly, but not exclusively, to manufacturing a polymeric industrial electrical machine.

BACKGROUND

Electrical machines, such as motors, generators and motor/generators, remain an area of interest. Some existing electrical machines have various shortcomings, drawbacks and disadvantages relative to certain applications. For example, in some electrical machine configurations, the ability to withstand washdown procedures, e.g., in the food and beverage industry, without corrosion or contamination may require expensive stainless steel housings. Accordingly, there remains a need for further contributions in this area of technology.

SUMMARY

Embodiments of the present invention include unique methods for manufacturing polymeric industrial electrical machines. Other embodiments include apparatuses, systems, devices, hardware, methods, and combinations for polymeric industrial electrical machines. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein:

FIGS. 13A-13D schematically illustrate a cross-sectional view and perspective views of some aspects of non-limiting examples of an electrical machine in accordance with an embodiment of the present invention. FIGS. 13B-13D illustrate some aspects of non-limiting examples of some components which might be used to overmold a single piece polymeric housing. The assembled components are illustrated in FIG. 13A, ready to be overmolded.

FIG. 14 schematically illustrates some aspects of a non-limiting example of an electrical machine having a single-piece polymeric housing in accordance with an embodiment of the present invention.

DETAILED DESCRIPTION OF THE ILLUSTRATIVE EMBODIMENTS

Figure 1:
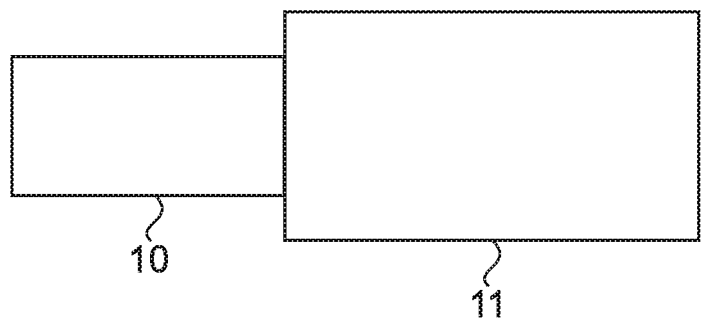
FIG. 1 schematically illustrates some aspects of a non-limiting example of an electrical machine coupled to driven equipment in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 2:
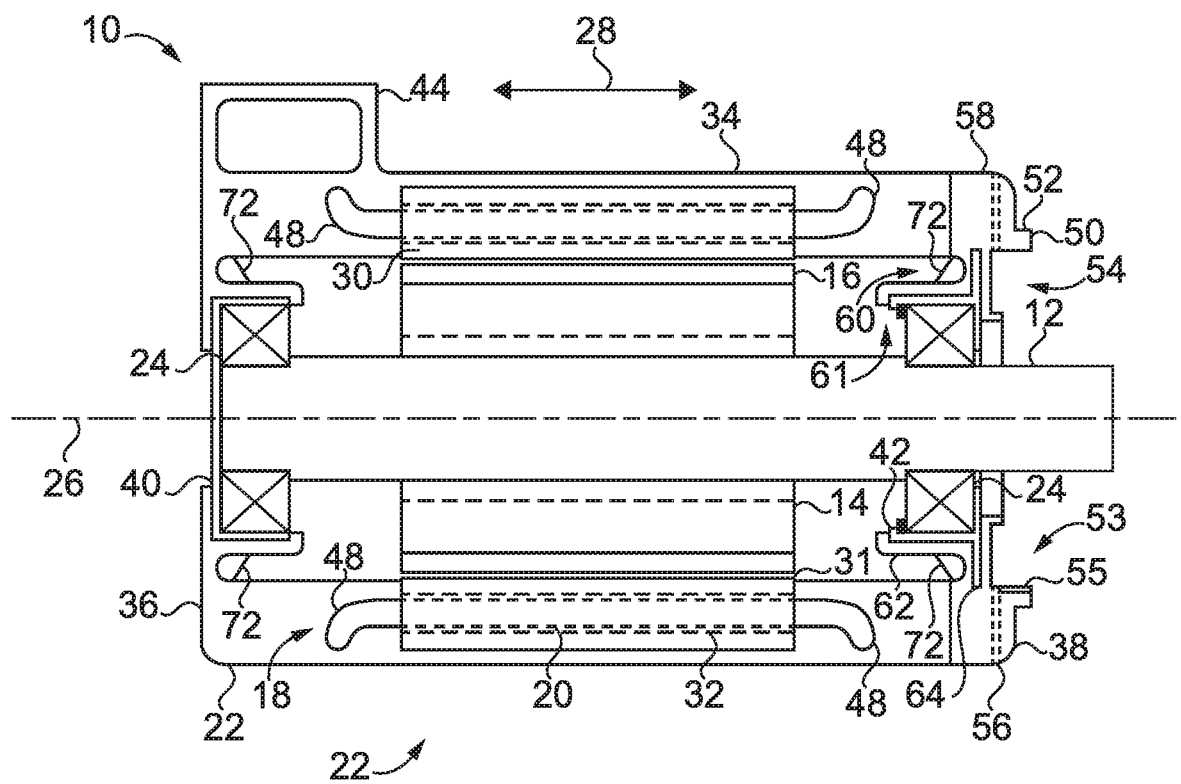
FIG. 2 schematically illustrates some aspects of a non-limiting example of an electrical machine in accordance with an embodiment of the present invention.
Figure 3:
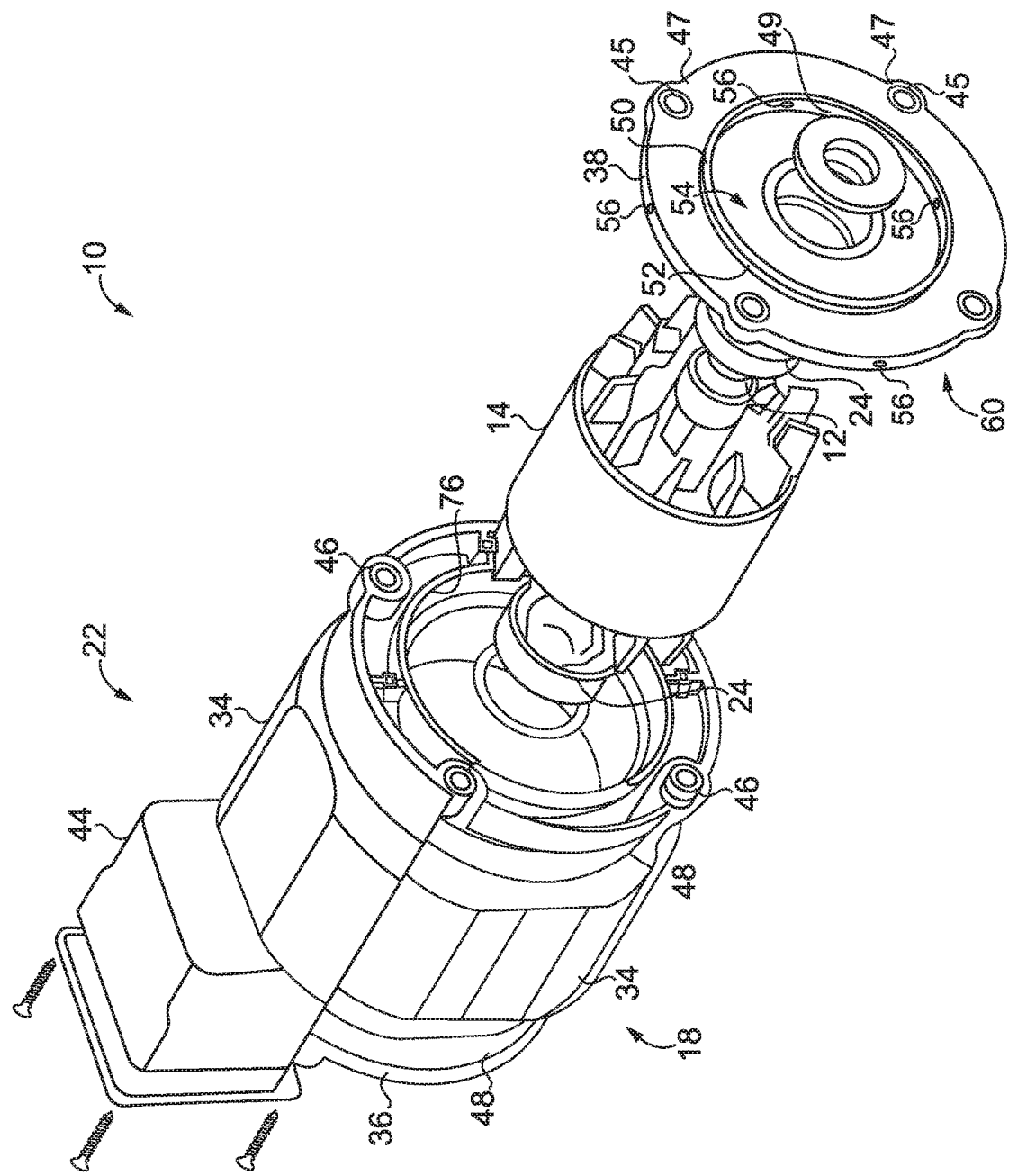
FIG. 3 illustrates a partial cutaway exploded perspective view of some aspects of a non-limiting example of an electrical machine in accordance with an embodiment of the present invention.
Figure 4B:
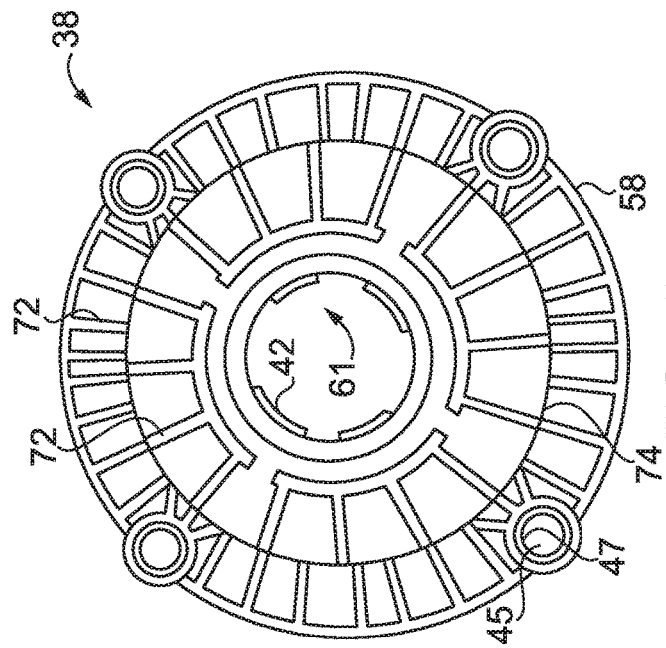
FIG. 4A-4D are respective interior perspective, exterior end, bottom perspective and interior end views illustrating aspects of a non-limiting example of a drive end endplate for an electrical machine in accordance with an embodiment of the present invention.
Figure 4D:
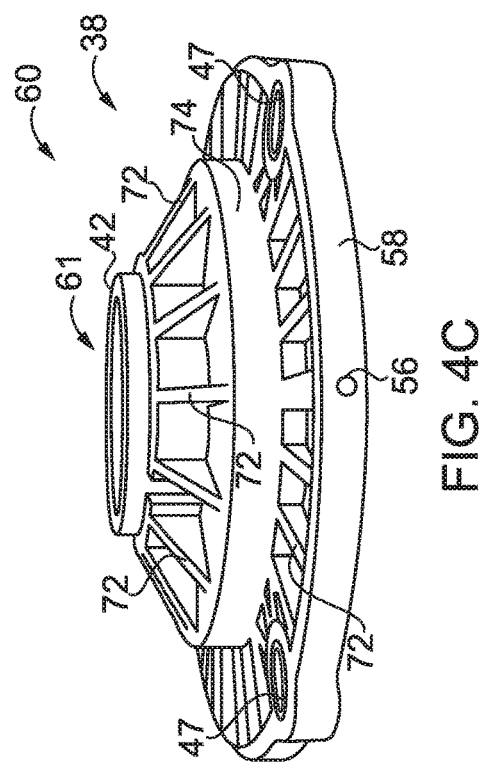
Figure 4A:
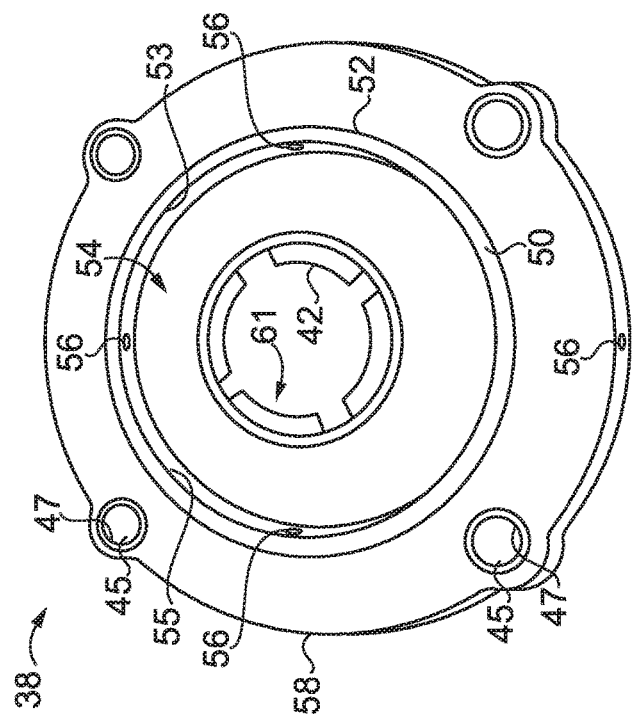
Figure 4C:
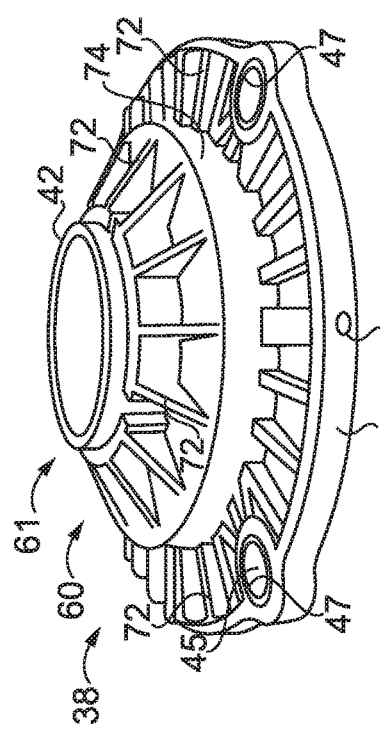

Referring to the drawings, and in particular FIGS. 1-3, some aspects of a non-limiting example of an electrical machine 10 in accordance with an embodiment of the present invention are schematically depicted. In one form, electrical machine 10 is a permanent magnet motor. In other embodiments, electrical machine 10 may be a motor and/or a generator. Electrical machine 10 may be any type of electrical machine, such as a switched reluctance motor, synchronous reluctance motor, permanent magnet assisted reluctance motor, a permanent magnet motor, an induction motor or any other type of motor, generator or motor/generator. In various embodiments, electrical machine 10 may be a radial flux machine, an axial flux machine or a machine having a three-dimensional (3D) flux path. Electrical machine 10 is constructed to mount to and drive driven equipment 11, e.g., a pump, a gearbox or another device or system.

In one form, electrical machine 10 is an industrial electrical machine, e.g., an industrial motor. In other embodiments, electrical machine 10 may not be an industrial electrical machine. In one form, electrical machine 10 is an industrial totally enclosed—not ventilated (TENV) machine. In some embodiments, electrical machine 10 may be an industrial totally enclosed water cooled (TEWC) machine. In a particular form, electrical machine 10 is an industrial washdown machine constructed for use in the food and beverage industry, and subject to being washed down with water, detergents, solvents, e.g., organic solvents, and other fluids, at least some of which may be or contain corrosive fluids and/or volatiles. In other embodiments, electrical machine 10 may be another type of industrial electrical machine. An industrial electrical machine is an electrical machine that is fixed in place or on a movable structure, not handheld, and is used in industry for one or more of various industrial or other purposes, e.g., in industrial processes, in the fabrication of industrial or consumer chemicals, materials and goods, the provision of consumer and industrial services, manufacturing facilities, municipalities, material handling and other industry, and is not an electrical machine used in consumer products, such as tools used around the home and in home or home-like workshops, such as handheld or fixed electric drills, electric screwdrivers, electric saws and the like used in home and home-like workshops, home appliances, automobile accessory electrical machines, e.g., window motors, cabin heater or air conditioning fan motors or the like. Industrial electrical machines may operate in harsher environments, e.g., chemicals, solvents, contamination, etc., that consumer electrical machines are not subject to or capable of being subject to without excessive damage.

Unlike industrial electrical machines, the power requirements for electrical machines used in consumer items is relatively low, and continuous service is not required, and thus, the mechanical strength and thermal dissipation requirements of such consumer electrical machines are low, unlike industrial electrical machines, which often operate continuously and at higher power output than electrical machines for consumer items. Industrial electrical machines thus have higher mechanical strength and thermal dissipation requirements, rendering consumer item electrical machines and their housings and components unsuitable for use in industrial electrical machines. An industrial electrical machine as that term is used herein includes electrical machines with power ratings up to about 5 hp, in some embodiments, and power ratings up to or in excess of about 25 hp in other embodiments. Electrical machine 10 includes a shaft 12, a rotor 14 having poles 16, a stator 18 including stator windings 20, a polymeric housing 22 and bearings 24. Shaft 12 and rotor 14 rotate about an axis of rotation 26, which defines an axial direction 28.

Shaft 12 is constructed to support rotor 14 and react radial and axial or thrust loads from rotor 14. In one form, shaft 12 is operative to transmit rotating mechanical shaft power from electrical machine 10 as an output of electrical machine 10. In other embodiments, shaft 12 may be operative to transmit mechanical power to and/or from electrical machine 10. Shaft 12 is axially and radially positioned by bearings 24. Shaft 12 and bearings 24 define axis of rotation 26 and corresponding axial direction 28. Shaft 12 is coupled to driven equipment 11, and is constructed to supply rotating shaft power to driven equipment 11.

Rotor 14 and stator 18 are in magnetic communication with each other. Each of rotor 14/poles 16 and stator 18 have a construction that is operative to direct magnetic flux toward and from each other for converting between electrical power and mechanical power. In various embodiments, rotor 14 includes operative sources of magnetic flux, e.g., bus bars, a squirrel cage, windings, and/or permanent magnets.

Polymeric housing 22 is constructed to house components of electrical machine 10, e.g., stator 18, rotor 14, most of shaft 12 and bearings 24. Polymeric housing 22 is constructed to structurally support electrical machine 10 and react torque loads generated by the electrical machine 10. In one form, polymeric housing 22 is the external housing of electrical machine 10, separating the internal components of electrical machine 10 from the environment in which electrical machine 10 is installed. In other embodiments, polymeric housing 22 may be an intermediate housing, e.g., disposed within a housing structure that separates electrical machine 10 from the environment in which it is installed. In still other embodiments, polymeric housing 22 may define both an external and an intermediate or internal housing.

Polymeric housing 22 is made of or formed by a polymeric material. In a more particular form, polymeric housing 22 is made of a thermoplastic. In other embodiments, polymeric housing 22 may also or alternatively be formed of one or more other polymeric materials. The polymeric material use to form polymeric housing 22 is constructed and configured to provide chemical resistance to a wide range of chemicals and/or to particular chemicals for selected applications, including strong mechanical performance, and thermal and chemical or environmental stability. In some embodiments, the polymeric material is particularly constructed and configured to withstand the fluids used in industrial washdown chemicals and procedures without deleterious effect. Examples of materials that may be used to form polymeric housing 22 include one or more polymer materials, or polymer composite materials, including but not limited to acetal and ketal based polymers and copolymers, polyesters (e.g. polyethylene terephthalate, polybutylene terephthalate), polycarbonate, polystyrene, polyether sulfone (PESU), polyphenylene sulfone (PPSU), polysulfone, and polytetrafluoroethylene (PTFE). Other polymers can also be implemented, including but not limited to polyvinyl chloride (PVC), polyethylene, polypropylene, polyetherimide (PEI), polyphenylene sulfide (PPS), polyether ether ketone (PEEK), polyphthalamide (PPA), polyoxymethylene (POM), phenolformaldehyde (PF), unsatured polyester (UP), polyurethane (PUR and PU), polyimide, polyamide, polyvinyl alcohol, polyvinylidene chloride, polyacrylonitrile and polyalkylene paraoxybenzoate. In some embodiments, the composite can include a variety of types of fibers, including but not limited to carbon fiber, glass fiber, wool, silk, cotton, rayon, cellulose, cellulose acetate, flax, ramie, jute and aramid fibers. In some embodiments, additives can be used to improve the qualities of the materials, including but not limited to the mechanical and thermal stability, chemical resistance, insulation property and flammability. The additives can include, but are not limited to, ceramics, alumina, calcium silicate, flame retardants and clays.

Stator 18 includes a laminated stator core 30 having a laminated stator core internal or inside diameter 31. Stator windings 20 are disposed within passages 32 in laminated stator core 30. In one form, stator windings 20 are copper conductors. In other embodiments, aluminum and/or other conductor materials may be employed in addition to or in place of copper. Stator windings 20 are constructed for magnetic communication with poles 16. Stator 18 is overmolded into and partially encapsulated by polymeric housing 22, e.g., by a central portion of polymeric housing 22, referred to as stator band 34. Stator band 34 is constructed to house stator 18, including laminated stator core 30 and stator windings 20 (including winding overhangs, described below). The term, "overmolded" as used herein refers to a characteristic structural form wherein the components are said to be overmolded if one of the components is a molded component, formed by molding, e.g., the polymeric material forming polymeric housing 22, and is molded to encapsulate another of the components to a degree that certain geometric features of the other component are encapsulated by or contained wholly or partially within or constrained by certain geometric features of the molded component, such that the components are locked to each other and cannot be removed from each other without fracturing or damaging one or more of the components. Overmolding may be achieved by, for example, injection molding, compression molding, transfer molding or other molding processes. In other embodiments, overmolding may be achieved by, for example, potting. In the illustrated embodiment, laminated stator core 30 is overmolded into polymeric housing 22, e.g., into stator band 34, and partially encapsulated by polymeric housing 22 within the polymeric material forming polymeric housing 22.

In one form, polymeric housing 22 is a unitary nonmetallic housing including an integral endplate 36 disposed at one end of stator band 34, i.e., integral with stator band 34. In some embodiments, housing 22 may be metallic. In some embodiments, endplate 36 may not be integral, but rather, may be attached or affixed to stator band 34. A second endplate 38 is attached to housing 22 at the opposite end of stator band 34. In one form, endplate 36 is a non-drive end endplate, and endplate 38 is a drive-end endplate, e.g., a pulley endplate. In some embodiments, endplate 36 may be the drive-end endplate integral with stator band 34, and endplate 38 may be the non-drive end endplate. In some embodiments, endplate 36 may be convex, e.g., conical, in order to aid in shedding fluids during and after washdown. In some embodiments, polymeric housing 22 also includes an integral conduit box 44. In other embodiments, conduit box 44 may be attached, e.g., glued or welded or otherwise affixed or attached to stator band 34 and/or endplate 36 and/or endplate 38. Still other embodiments may not include a conduit box. In one form, drive end endplate 38 is a polymeric drive end endplate, e.g., formed of a polymeric material, such as one or more polymeric materials described above with respect to polymeric housing 22.

Overmolded with endplates 36 and 38 are respective sleeves 40 and 42. In one form, sleeves 40 and 42 are metallic. In one form, sleeves 40 and 42 are constructed to increase the stiffness of respective endplates 36 and 38, e.g., by virtue of having cylindrical portions with flanges, the diameter and thickness of each of which is configured to increase the stiffness of respective endplates 36 and 38. In addition, the axial length and/or other features of sleeves 40 and 42 may be configured to add stiffness to respective endplates 36 and 38. In other embodiments, sleeves 40 and/or 42 may not be constructed to increase the stiffness of the respective endplates. In some embodiments, sleeves 40 and/or 42 may be formed of the same material as respective endplates 36 and/or 38, and may be formed as part of the respective endplates 36 and/or 38. In other embodiments, one or both of sleeves 40 and 42 may be nonmetallic, and may be any suitable material. In one form, respective bearings 24 are mounted in bearing sleeves 40 and 42, which are operative to pilot the respective bearings 24. In other embodiments, sleeves 40 and 42 may form parts of the corresponding bearings 24, e.g., may be outer races or journals. Sleeves 40 and 42 may be overmolded with respective endplates 36 and 38 by forming retaining features on the sleeves, inserting the sleeves in a mold, and injecting the polymeric material forming endplates 36 and 38 into the mold in an injection molding process to form the endplates, such that the endplate polymeric material flows around and encapsulates retaining features of the sleeve during the molding process, e.g., load-bearing features and/or other retention features.

Bearings 24 are constructed to react shaft 12 and rotor 14 axial or thrust loads in direction 28, and to react shaft 12 and rotor 14 radial loads perpendicular to axis of rotation 26. Polymeric housing 22 is constructed to enclose stator 18 and react loads associated with stator 18, e.g., torque loads and any other loads generated due to magnetic interaction between stator 18 and rotor 14 during the operation of electrical machine 10. Polymeric housing 22 is also constructed to react thrust loads delivered through bearings 24.

Stator band 34 is in self-locked engagement with laminated stator core 30. By "self-locked engagement," it is meant that the components so described are locked together absent the use of separate or other intermediate components to attain the condition of being locked together, e.g., absent the use of screws, bolts, retaining rings, clamps, or the like, and are not free to displace in any direction relative to each other, other than by such phenomena as mechanical stress/strain and/or relative thermal expansion or contraction, and in some situations, hygroscopic expansion and/or contraction. Self-locked engagement may be achieved in various manners. For example, self-locked engagement may be achieved where two or more components are overmolded together, or by employing an interference or press fit between two or more components to achieve self-locked engagement of the components. Laminated stator core 30 and stator windings 20 are overmolded with stator band 34 of polymeric housing 22, e.g., using an injection molding process. In some such embodiments, winding leads from stator windings 20 may be over-molded with stator band 34 and/or endplate 36 and/or conduit box 44. Stator band 34 includes a plurality of threaded inserts 46 overmolded therein. Threaded inserts 46 are constructed to react electrical machine 10 mounting loads and torque loads. In some embodiments, threaded inserts 46 extend beyond stator band 34 and into drive end endplate 38. Drive end endplate 38 includes a corresponding plurality of openings 45 constructed to receive threaded inserts 46 thereinto. In some embodiments, openings 45 may include metallic anti-creep spacers 47 disposed therein and constructed to absorb axial loads and prevent or reduce creep, e.g., enlargement, of openings 45. In some embodiments, a washer seal 49, e.g., a plastic washer seal, may be mounted on shaft 12 and rotate with shaft 22 to reduce or eliminate fluid ingress across shaft 12 into electrical machine 10 during washdown. Bolts (not shown) may engage threaded inserts 46 through openings 45 (and anti-creep spacers in embodiments so equipped) to secure drive end endplate 38 to polymeric housing 22 and/or to secure polymeric housing 22 and electrical machine 10 to driven equipment 11.

Stator windings 20 include a winding overhang 48 on each side of laminated stator core 30. Winding overhangs 48 extends axially from laminated stator core 30, e.g., axially outward or away from laminated stator core 30. Winding overhangs 48 are overmolded into stator band 34 of polymeric housing 22.

Referring also to FIGS. 4A-4D and 5, drive end endplate 38 is constructed to mount electrical machine 10, e.g., onto driven equipment 11 (FIG. 1). Drive end endplate 38 includes a polymeric stiffening structure 60 and a metallic structure 61 overmolded into drive end endplate 38 and constructed to enhance the mechanical strength and stiffness of drive end endplate 38. In one form, the metallic structure 61 is bearing sleeve 42. Bearing sleeve 42 includes a cylindrical portion 62 and a flange 64 constructed to enhance the mechanical stiffness and strength of drive end endplate 38. Flange 64 includes openings 66, e.g., in the form of slots 68 and holes 70 constructed to receive the polymeric material forming polymeric drive end endplate 38 during overmolding, which aid in locking bearing sleeve 42 in drive end endplate 38, and increase the strength and rigidity of the overmolded and locked engagement of bearing sleeve 42 with drive end endplate 38. Cylindrical portion 62 is also constructed to receive bearing 24.

Polymeric stiffening structure 60 includes polymeric ribs 72 constructed to stiffen drive end endplate 38, enhance the mechanical strength of drive end endplate 38 and in some embodiments to react electrical machine 10 overhang loads. In the inner portion of drive end endplate 38, the ribs 72 are conical, although other shapes may be employed in other embodiments. In some embodiments, integral non-drive end endplate 36 may also include polymeric ribs 72 constructed to stiffen integral non-drive end endplate 36 and enhance the mechanical strength of non-drive end integral endplate 36 Drive end endplate 38 also includes a pilot diameter 74 constructed to radially position drive end endplate 38 with electrical machine 10 by piloting drive end endplate 38 against a mating pilot diameter 76 (FIG. 3) in housing 22, e.g., in stator band 34, adjacent to stator 30.

Drive end endplate 38 includes a rabbet 50. Rabbet 50 is constructed to interface with driven equipment 11. Rabbet 50 is constructed to radially position drive end endplate 38 relative to driven equipment 11, e.g., by piloting driven equipment 11 on an outside diameter 52 of rabbet 50. Some embodiments may employ an inside diameter 53, e.g., on rabbet 50, to pilot and position driven equipment 11. In some embodiments, inside diameter 53 may include crushable ribs 55, which in some embodiments may be formed as a straight or a helical knurl, to pilot, position and align electrical machine 10 with driven equipment 11. Drive end endplate 38 includes a cavity 54 formed therein, e.g., disposed radially inward of rabbet 50, and a plurality of drain holes 56 open to cavity 54. Drain holes 56 are constructed to drain cavity 54 through drive end endplate 38, e.g., to an outer diameter 58 of drive end endplate 38, for example, to drain any fluid seepage entering cavity 54 from the interface between drive end endplate 38 and driven equipment 11 during washdown.

Figure 6:
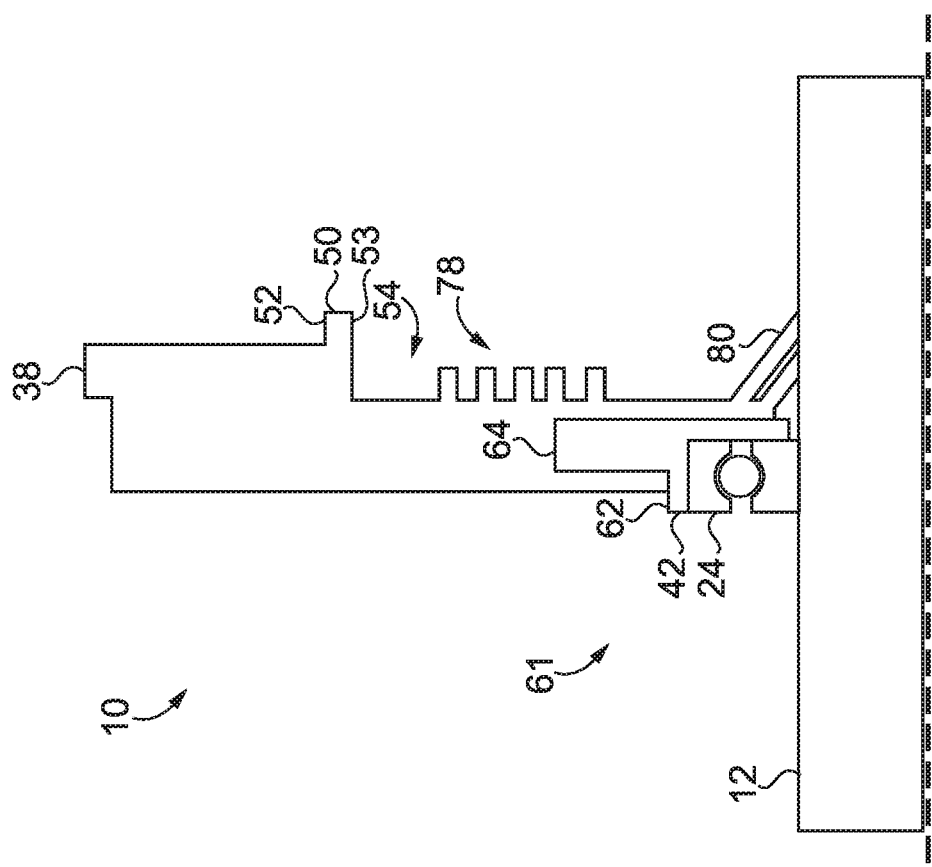
FIG. 6 schematically illustrates some aspects of a non-limiting example of a drive end endplate for an electrical machine in accordance with an embodiment of the present invention.

Referring also to FIG. 6, in some embodiments, drive end endplate 38 includes a polymeric labyrinth seal 78 constructed to seal against driven equipment 11 (FIG. 1) and discourage the ingress of fluids into the interface between drive end endplate 38 and driven equipment 11, e.g., during washdown. In some embodiments, drive end endplate 38 may include a molded polymeric shaft seal 80 constructed to extend to and seal shaft 12, and in some embodiments contact and seal against shaft 12. In some embodiments, molded polymeric shaft seal 80 is conical in shape. In some embodiments, molded polymeric shaft seal 80 is in the form of a labyrinth seal.

Figure 7:
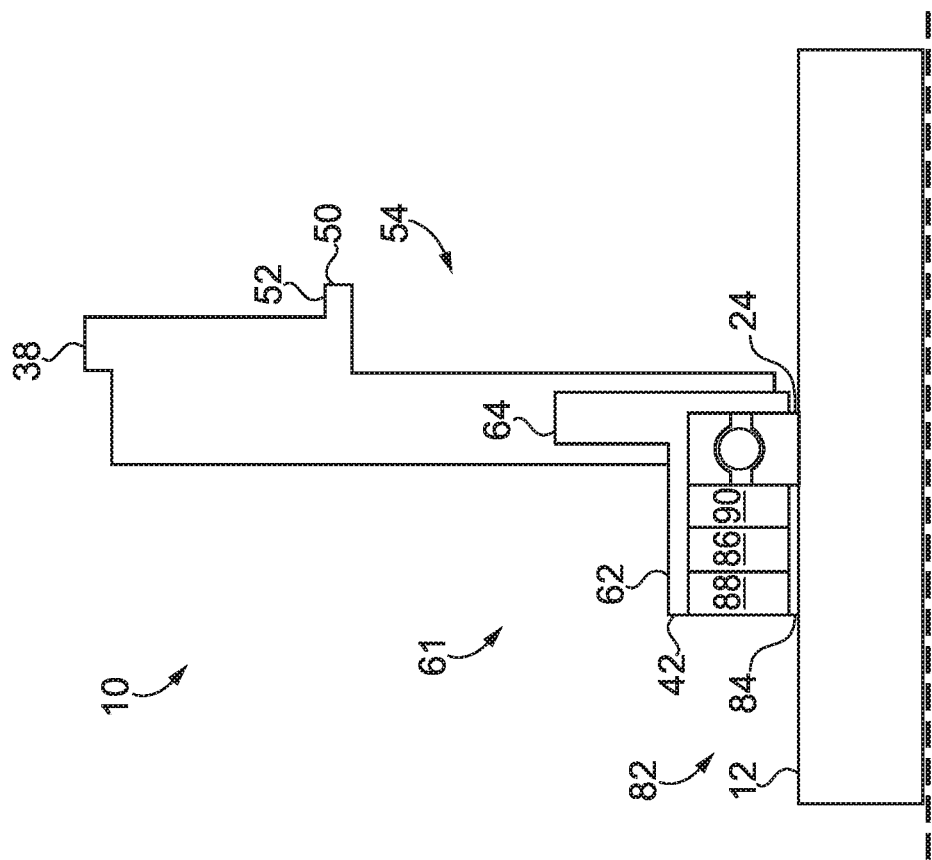
FIG. 7 schematically illustrates some aspects of a non-limiting example of a drive end endplate for an electrical machine in accordance with an embodiment of the present invention.

Referring also to FIG. 7, in some embodiments, electrical machine 10 may include a ferrofluidic seal 82 constructed to seal between drive end endplate 38, e.g., metallic structure 61, and shaft 12. In one example, ferrofluidic seal 82 is housed in cylindrical portion 62 of bearing sleeve 42, and seals between cylindrical portion 62 and shaft 12. In other embodiments, ferrofluidic seal 82 may be disposed in other locations. Ferrofluidic seal 82 may include, for example, a ferrofluid film 84 disposed or suspended between shaft 14 and one or more discs forms formed of a magnetic material and piloted by cylindrical portion 62, e.g., a hard magnetic material disc 86 axially sandwiched between soft magnetic material discs 88 and 90. In other embodiments, ferrofluidic seal 82 may take other forms or may be of other configurations.

Figure 8:
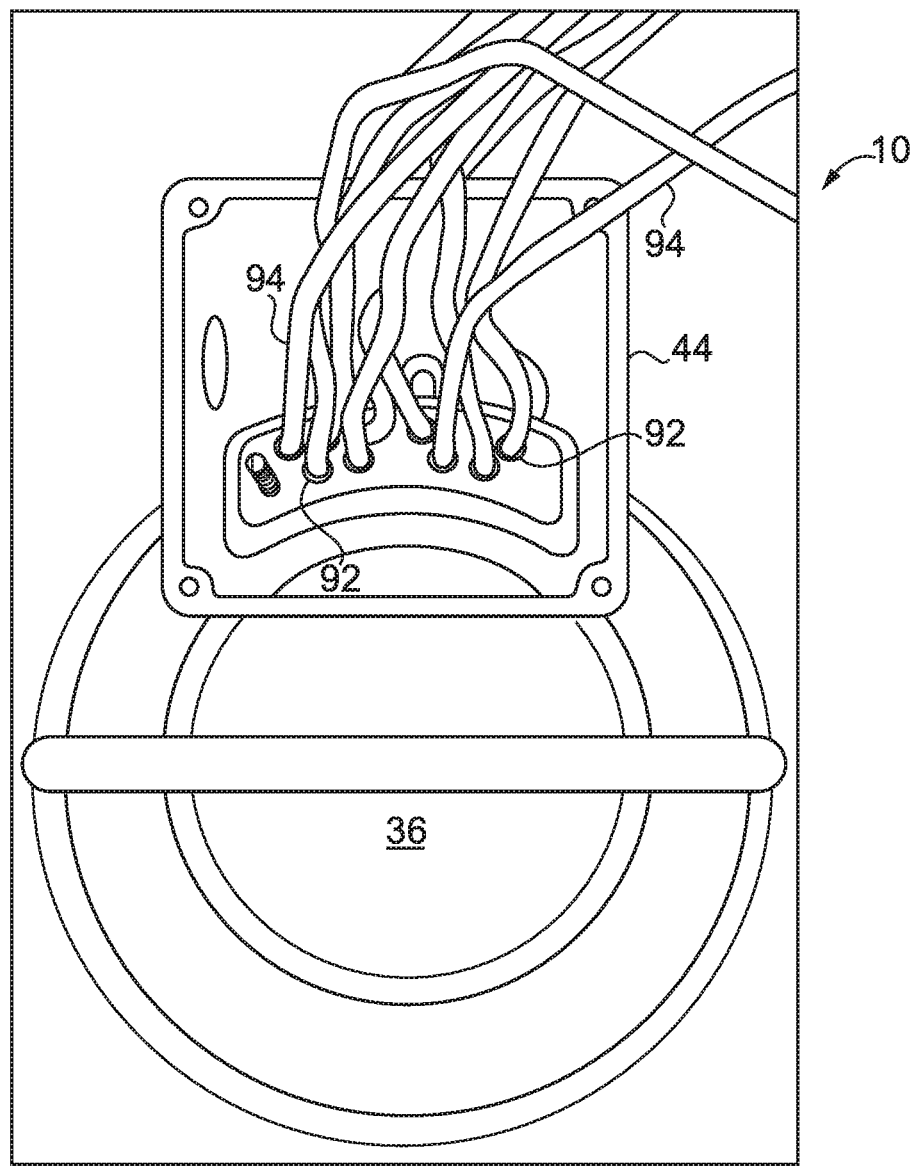
FIG. 8 schematically illustrates some aspects of a non-limiting example of an electrical machine in accordance with an embodiment of the present invention.
Figure 9A:
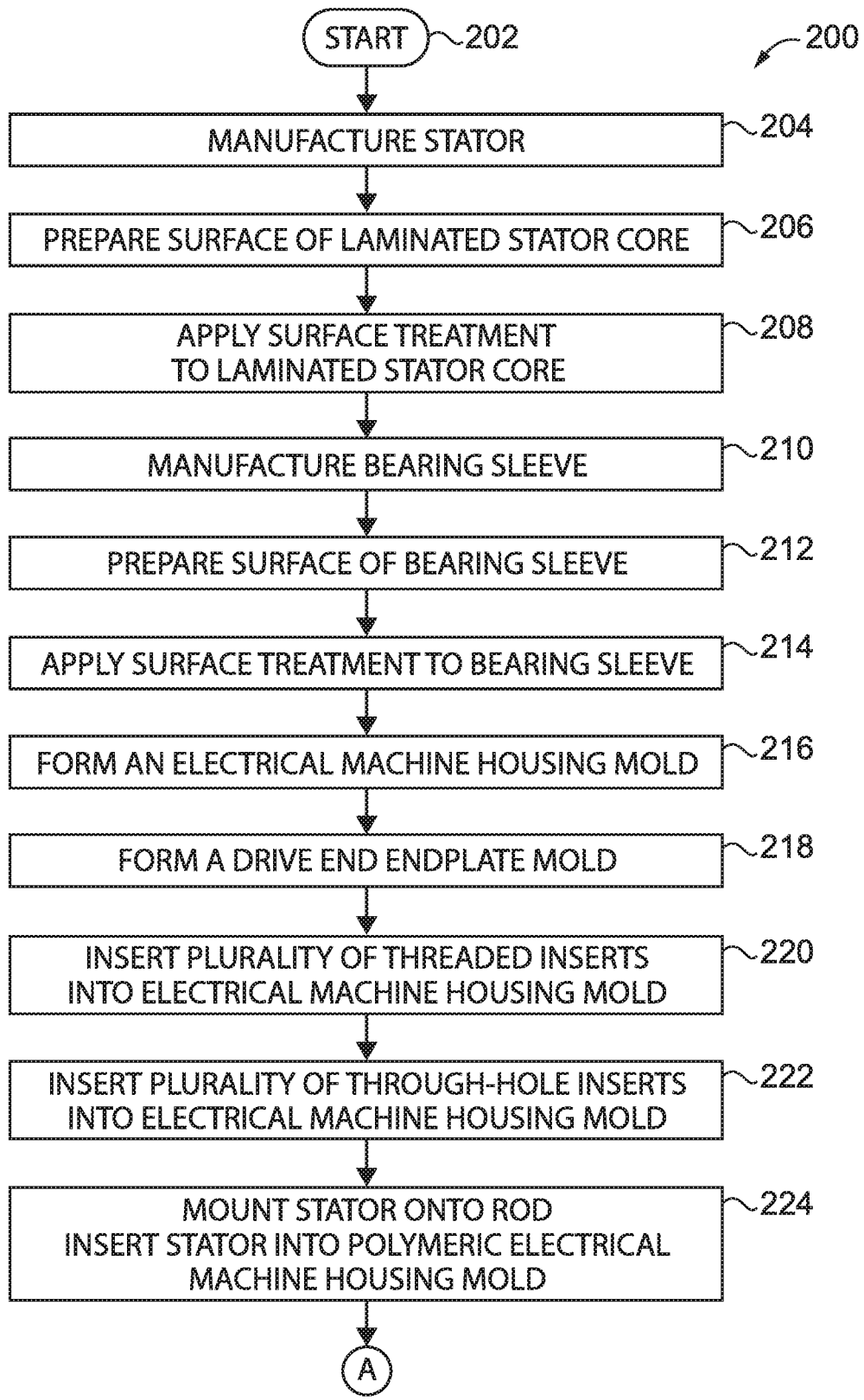
FIGS. 9A and 9B are a flowchart depicting some aspects of a non-limiting example of a method for manufacturing a polymeric electrical machine in accordance with an embodiment of the present invention.
Figure 9B:
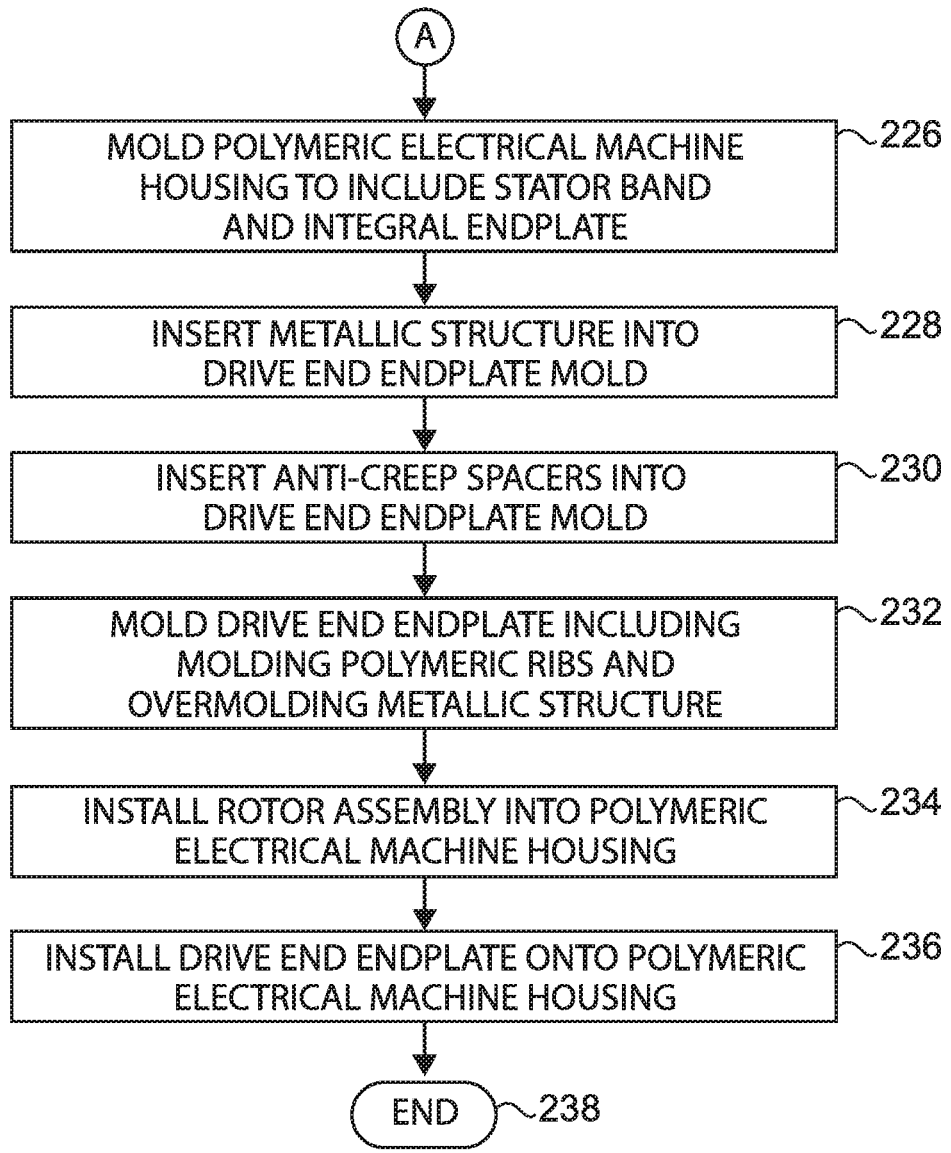
Figure 10:
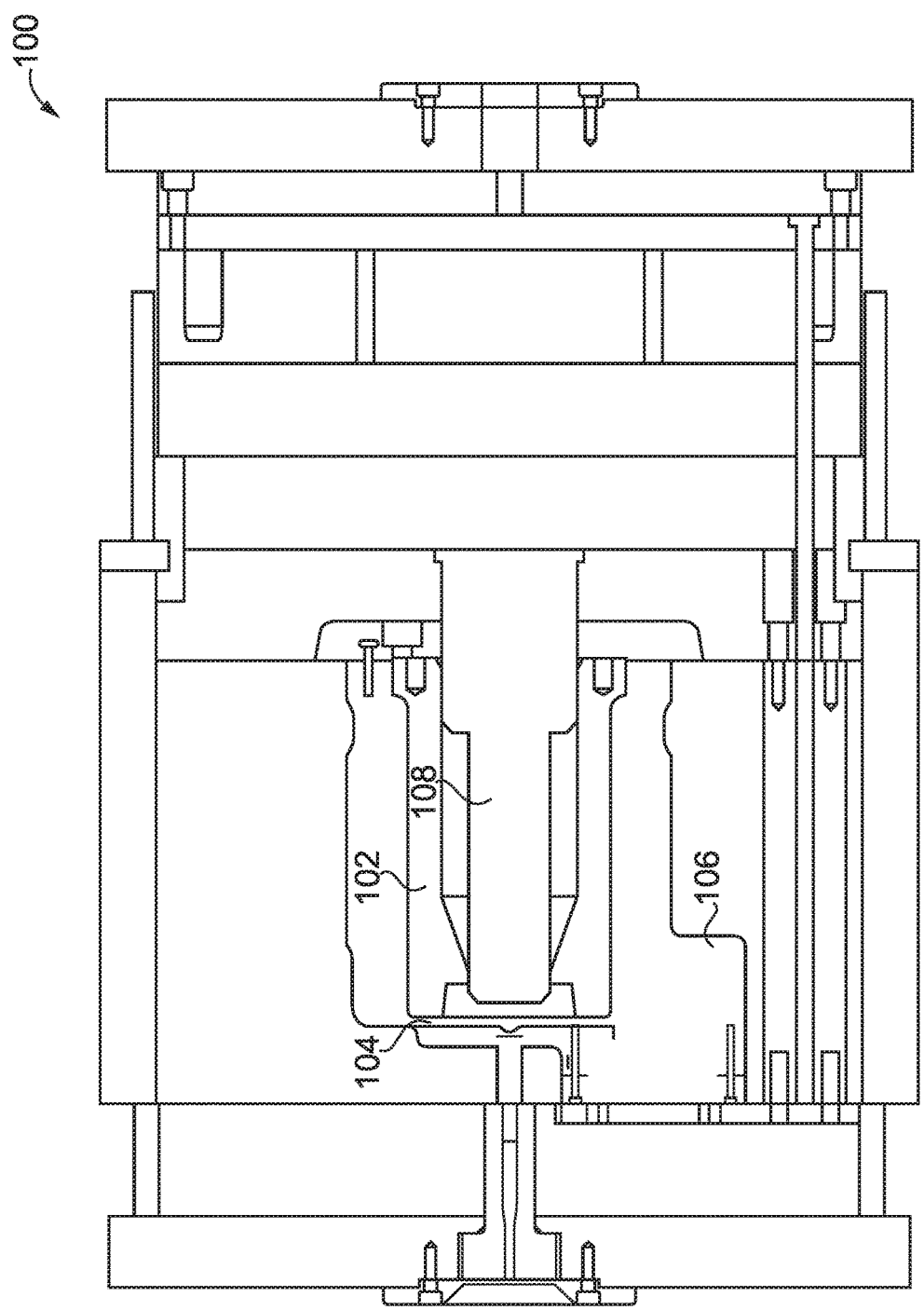
FIG. 10 schematically illustrates some aspects of a non-limiting example of an electrical machine housing mold in accordance with an embodiment of the present invention.

Referring also to FIG. 8, electrical machine 10 includes a plurality of through-hole inserts 92 disposed in polymeric housing 22, e.g., in conduit box 44. A plurality of electrical leads 94 are disposed in and extend through through-hole inserts 92 from the interior of electrical machine 10. The electrical leads 94 may be, for example, winding leads for stator windings 20, sensor leads or other electrical leads.

Referring also to FIGS. 9A, 9B, 10 and 11, some aspects of a method for manufacturing polymeric electrical machine 10 are illustrated in a flowchart 200 in accordance with an embodiment of the present invention. Process flow starts at block 202. The process is not limited to the sequence in the order illustrated and described.

At block 204, stator 18 is manufactured, including stator windings 20, laminated stator core 30 and winding overhangs 48.

At block 206, a surface of stator 18, in particular, of laminated stator core 30, is prepared is prepared to receive the application of one or more surface treatments, e.g., by washing to remove dirt. In some embodiments, some side surfaces or portions of side surfaces of laminated stator core 30 may also be prepared to receive the application of one or more surface treatments. Preparations may include, in some embodiments, grinding, and inserts may be added. In various embodiments, the surface preparation may take place before or after installation of the windings 20 into laminated stator core 30.

At block 208, one or more surface treatments are applied to stator 18, e.g., to laminated stator core 30, e.g., to the outside diameter and in some embodiments side surfaces or portions of side surfaces that were prepared at block 206. The surface treatments are constructed to enhance stability of the electrical machine and housing, and adherence of the polymeric material used to form stator band 34 of polymeric housing 22 to laminated stator core 30, reducing interface defects, i.e., defects at the interface between the polymeric material forming stator band 34 and laminated stator core 30. Non-limiting examples of suitable surface treatments include, among other things, roughening, sand blasting, chemical treatments, coating and/or cleaning, such as removing oil or other contaminants and/or oxidation.

Figure 5:
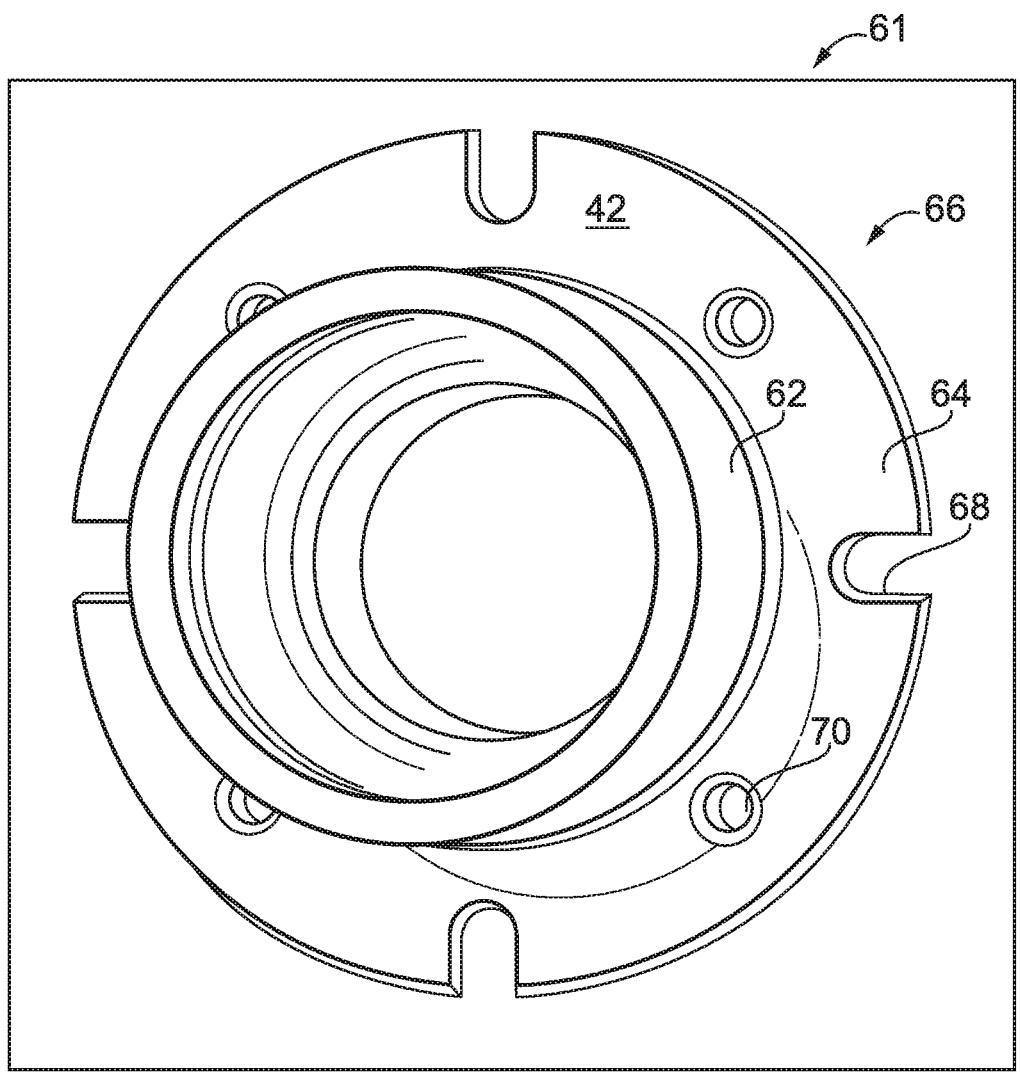
FIG. 5 illustrates some aspects of a non-limiting example of a metallic structure in the form of a bearing sleeve constructed to enhance the mechanical strength and stiffness of a drive end endplate in accordance with an embodiment of the present invention.

At block 210, metallic structure 61 in the form of bearing sleeve 42 is manufactured (FIG. 5). Bearing sleeve 40 is also manufactured. Bearing sleeve 42 is formed to include cylindrical portion 62 and flange 64, and to include openings 66, e.g., in the form of slots 68 and holes 70 in flange 64 constructed to receive the polymeric material forming the drive end endplate 38 during overmolding of the metallic structure 61 or bearing sleeve 42. Bearing sleeve 40 may also be formed with a cylindrical portion, a flange and openings in the flange as with bearing sleeve 42 constructed to receive the polymeric material forming the drive end endplate 38 during overmolding of the bearing sleeve 40 in integral non-drive end endplate 36.

At block 212, surfaces of flange 64 and the outer diameter surface of cylindrical portion 62 of bearing sleeve 42 are prepared to receive the application of a surface treatment, e.g., by washing. Similar surface preparations may be performed on bearing sleeve 40.

At block 214, one or more surface treatments are applied to the prepared surfaces of bearing sleeve 42. The surface treatments are constructed to enhance stability of the electrical machine and housing, and adherence of the polymeric material used to form drive end endplate 38 to bearing sleeve 42, reducing interface defects, i.e., defects at the interface between the polymeric material forming drive end endplate 38 and bearing sleeve 42. Non-limiting examples of suitable surface treatments include, among other things, roughening, sand blasting, chemical treatments, coating and/or cleaning, such as removing oil or other contaminants and/or oxidation. Similarly, one or more surface treatments may also be applied to surfaces of bearing sleeve 40 to enhance stability of the electrical machine and housing, and adherence of the polymeric material used to form integral non-drive end endplate 36 to bearing sleeve 40, reducing interface defects between the two components.

At block 216, an electrical machine housing mold 100 (see FIG. 10) is manufactured or formed. Electrical machine housing mold 100 is constructed to mold a polymeric electrical machine housing 22 including a stator band 34 with an integral endplate, e.g., non-drive end endplate 36, using a polymeric material, e.g., described hereinabove. Electrical machine housing mold 100 includes a cavity 102 for forming stator band 34, a cavity 104 for forming integral non-drive end endplate 36, and in some embodiments, a cavity 106 for forming an integral conduit box 44. Electrical machine housing mold 100 includes a mandrel 108 for mounting stator 18. Mandrel 108 is constructed to pilot or position stator 18 by engaging laminated stator core 30, and to have a fit with the inside, e.g., inside diameter 31 (see FIG. 1), of laminated stator core 30. The fit is sized to be small enough to prevent a flow of the polymeric material between laminated stator core 30 and mandrel 108, thus preventing a buildup of polymeric material in the air gap between rotor 14 and laminated stator core 30, while being large enough to allow stator 18 assembly to and disassembly from mandrel 108. In some embodiments, mandrel 108 may be an expanding mandrel.

Figure 11:
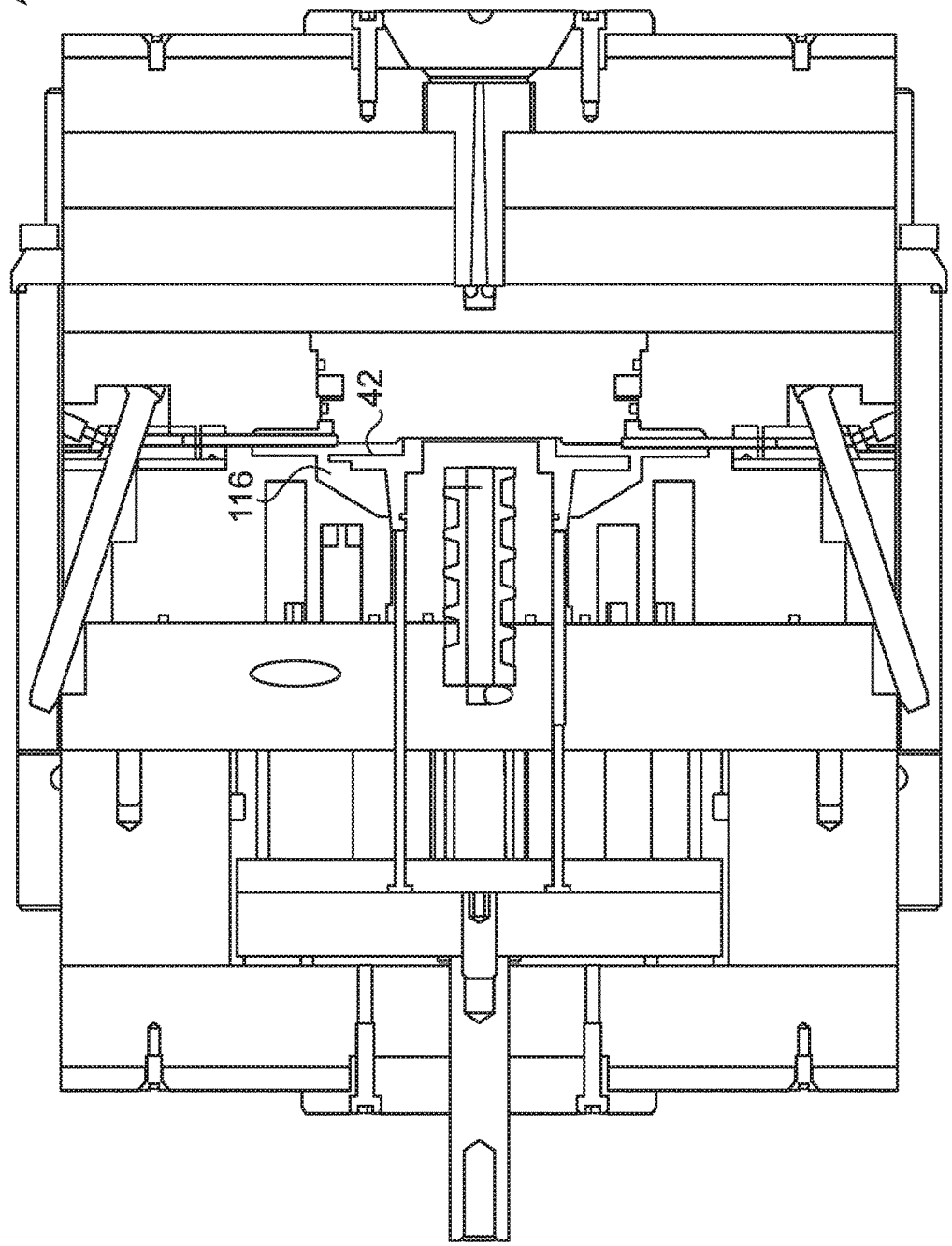
FIG. 11 schematically illustrates some aspects of a non-limiting example of a drive end endplate mold in accordance with an embodiment of the present invention.
Figure 12A:
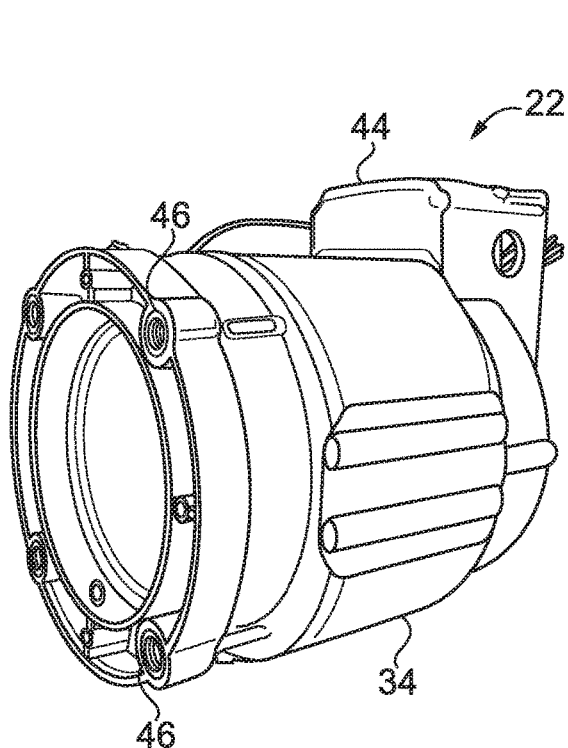
FIGS. 12A-12D are a front perspective view, a rear perspective view, a side view and a top view illustrating some aspects of a non-limiting example of a polymeric electrical machine housing in accordance with an embodiment of the present invention.
Figure 12B:
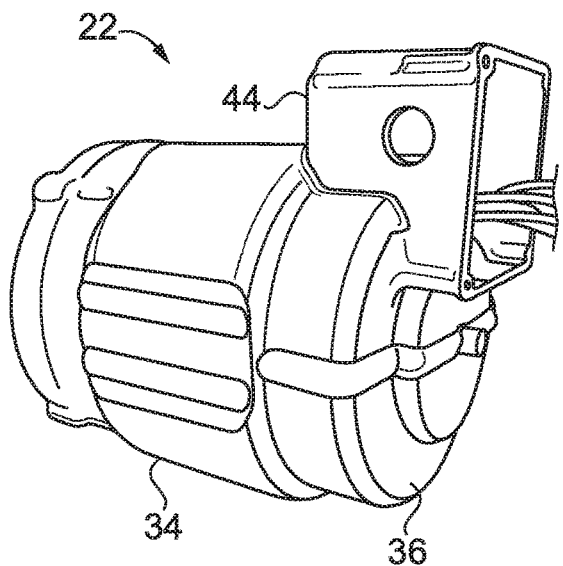
Figure 12C:
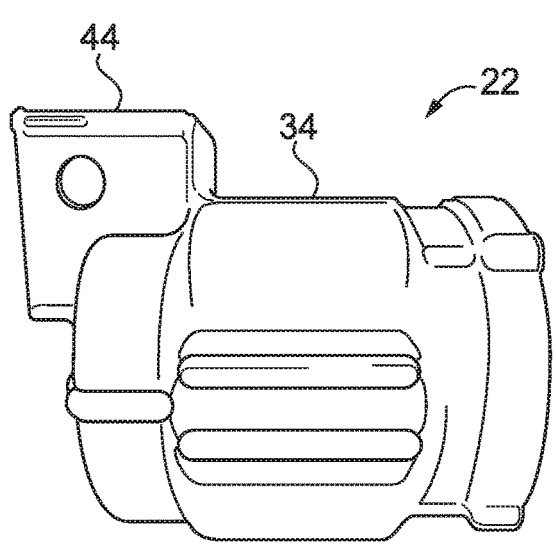
Figure 12D:
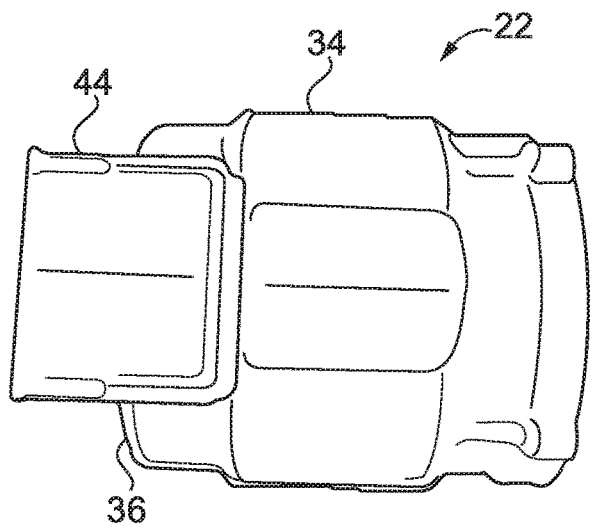

At block 218, a drive end endplate mold 114 is manufactured or formed (FIG. 11). Drive end endplate mold 114 is constructed to mold drive end endplate 38 using a polymeric material, e.g., described hereinabove. Drive end endplate mold 114 includes a cavity 116 for forming drive end endplate 38 and for overmolding bearing sleeve 42 therein.

At block 220, threaded inserts 46 (see FIG. 3) are inserted into electrical machine housing mold 100.

At block 222, through-hole inserts 92 (see FIG. 8) are inserted into electrical machine housing mold 100, e.g., inside cavity 106 for conduit box 44.

At block 224, stator 18 is mounted onto mandrel 108, fitting the inside diameter 31 of laminated stator core 30 onto mandrel 108, and stator 18 is mounted into electrical machine housing mold 100. In some embodiments, mandrel 108 may be inserted into stator 18, and then the assembly of both may be inserted into electrical machine housing mold 100. In other embodiments, mandrel 108 may be retained inside of electrical machine housing mold 100, and then stator 18 simultaneously mounted on mandrel 108 and inserted into electrical machine housing mold 100. Bearing sleeve 40 is also inserted into electrical machine housing mold 100.

At block 226, polymeric electrical machine housing 22 is molded to include stator band 34 and integral non-drive end endplate 36. In some embodiments, polymeric electrical machine housing 22 is molded to include integral conduit box 44. During the molding process, stator 18 is overmolded into stator band 34, which includes overmolding laminated stator core 30 and stator windings 20, including overmolding winding overhangs 48 within stator band 34. In addition, bearing sleeve 40 (FIG. 1) is overmolded into integral non-drive end endplate 36, threaded inserts 46 (FIG. 3) are overmolded into stator band 34, and through-hole inserts 92 (FIG. 8) are overmolded, e.g., into integral conduit box 44.

FIGS. 12A-12D are a front perspective view, a rear perspective view, a side view and a top view of some aspects of a non-limiting example of a polymeric electrical machine housing 22 in accordance with an embodiment of the present invention. In one form, polymeric electrical machine housing 22 and drive end endplate 38 are formed via injection molding. In other embodiments, compression molding, other molding processes such as transfer molding, or potting, dip-coating or spraying processes may be employed. The illustrated embodiment is constructed for face-mounting via drive end endplate 38, although in other embodiments, housing 22 may include a foot or feet for foot-mounting.

At block 228 (FIG. 9B), metallic structure 61, e.g., bearing sleeve 42, is inserted into drive end endplate mold 114.

At block 230 (FIG. 9B), anti-creep spacers 47 (FIGS. 3 and 4A-4D) are inserted into drive end endplate mold 114 in some embodiments.

At block 232 (FIG. 9B), drive end endplate 38 is molded in drive end endplate mold 114, including forming a plurality of polymeric ribs 72, and including overmolding metallic structure 61, i.e., bearing sleeve 42, into drive end endplate 38. Metallic structure 61 is constructed to enhance mechanical strength of drive end endplate 38. The molding of drive end endplate 38 also includes overmolding metallic anti-creep spacers 47 into attachment openings 45 on drive end endplate 38 in some embodiments. Attachment openings 45 and anti-creep spacers 47 are radially and circumferentially aligned with the threaded inserts 46 (FIGS. 3 and 12A-12D) overmolded into stator band 34. Attachment openings 45 and anti-creep spacers 47 (in embodiments so equipped) used to attach drive end endplate 38 to housing 22 via bolts (not shown) engaging threaded inserts 46. In some embodiments, the bolts also secure electrical machine 10 to driven equipment 11 by extending through a wall or other portion of driven equipment 11, through openings 45 (and anti-creep spacers 47 in embodiments so equipped), and into threaded engagement with threaded inserts 46. The molding of drive end endplate 38 additionally includes, in some embodiments, the molding of rabbet 50 and cavity 52 (FIGS. 1, 3, 4B, 6 and 7), and drain holes 56 open to cavity 54 and outer diameter 58 of drive end endplate 38 (FIGS. 1, 4A, 4B and 4C), and in some embodiments, molded polymeric shaft seal 80. The molding of drive end endplate 38 further includes, in some embodiments, molding an axial-facing labyrinth seal 78 (FIGS. 6 and 7) into drive end endplate 38.

At block 234 (FIG. 9B), a rotor assembly, including rotor 14, shaft 12, bearings 24, and in some embodiments, cooling fans and ferrofluidic seal 82, are installed into polymeric electrical machine housing 22. Some elements may be installed directly onto drive end endplate 38, for example, a bearing 24 and ferrofluidic seal 82, along with a retaining ring, may be installed into bearing sleeve 42.

At block 236 (FIG. 9B), drive end endplate 38 is installed onto polymeric electrical machine housing 22, e.g., using bolts that pass through openings 45 and engage threaded inserts 46 in stator band 34. Process flow ends at block 238.

Referring to FIGS. 13A-13D and 14, an embodiment employs a one-piece molding process to yield a single-piece polymeric housing 22 having an integral stator band 34 with an integral non-drive end endplate 36 and an integral drive end endplate 38. In this embodiment, internal electrical machine components 120 of electrical machine 10 are assembled together and placed in a mold 122 together, and then molded or overmolded to form single-piece polymeric housing 22 with an integral stator band 34 having an integral non-drive end endplate 36 and an integral drive end endplate 38. For example, rotor 14 with shaft 12 are inserted into stator 18; bearings 24 are mounted on shaft 12; bearing sleeves 40 and 42 are mounted onto bearings 24, forming an assembly 124. Other components may also be included in assembly 124, e.g., threaded inserts 46 (FIG. 3), anti-creep spacers 47 (FIG. 3), through hole inserts 92 (FIG. 8), ferrofluidic seal 82 (FIG. 7), electrical leads 94 (FIG. 8) and/or other components of electrical machine 10 described herein. The assembly 124 is inserted into mold 122. Polymeric housing 22 with integral stator band 34, integral non-drive end endplate 36 and integral drive end endplate 38 is then molded around assembly 124 using mold 122, yielding electrical machine 10 with electrical machine components 120 molded therein, including overmolding stator 18 and winding overhangs 48 therein.

In some embodiments, molding cups 126 and 128 may be employed (shown in partial perspective views in FIGS. 13B and 13C, respectively). The molding cups 126 and 128 may form a part of assembly 124, and may be seated against stator 18, i.e., against laminated stator core 30 (shown in FIG. 2), radially inward of winding overhangs 48. Molding cups 126 and 128 are constructed to radially and axially position electrical machine components 120 of assembly 124, and to prevent the flow of polymeric material into undesirable locations during the molding process. For example, active components such as shaft 12, rotor 14, and bearings 24 may be inserted into stator 18. An adhesive may be placed on molding cups 126 and 128, and the cups may be placed onto bearings 24 or bearing sleeves 40 and 42. Mold cups 126 and 128 are constructed to protect the internal structure of electrical machine 10 to prevent liquid polymer (e.g., thermoplastic or thermosetting material) from flowing into the motor cavity 130 (formed between stator 18, rotor 14, bearings 24 and in some embodiments, bearing sleeves 40 and 42) during molding. In some embodiments, assembly 124 may include a seal 132 mounted on shaft 12 adjacent to and external of mold cup 128. The seal 132 may be overmolded into the integral drive end endplate 38, or may be removable. In some embodiments, assembly 124 include one or more Belleville or wave washers (not shown) operative to provide a thrust load to one or both bearings 24. In such embodiments, assembly 124 may be placed into a jig to locate rotor 14 and pre-load the Belleville or wave washers while the adhesive cures. Assembly 124 is then placed into mold 122 for forming polymeric housing 22 with integral stator band 34, integral non-drive end endplate 36 and integral drive end endplate 38 by injection molding or another molding process.

Some embodiments may employ a fusible core 134 formed in motor cavity 130. Fusible core 134 may be molded into motor cavity 130. Fusible core 134 is constructed to radially and axially position electrical machine components 120 of assembly 124, and to prevent the flow of polymeric material into undesirable locations during the molding process. The fusible core 134 may be made of, for example, a wax or polymeric material. After molding is complete, fusible core 134 may be removed by chemical leeching or etching, thermal removal, e.g., melting fusible core 134 and draining the melt product from electrical machine 10 via temporary or permanent openings (not shown) and/or mechanical grinding or other mechanical removal processes, hybrid or other methods to open motor cavity 130 and allow the operation of electrical machine 10.

Embodiments of the present invention include a method for manufacturing a polymeric electrical machine, comprising: manufacturing a stator including a laminated stator core and a plurality of windings including winding overhangs extending from the laminated stator core; applying a surface treatment to the laminated stator core, the surface treatment being constructed to reduce defects at an interface between a polymeric material and the laminated stator core and enhance adherence between the polymeric material and the laminated stator core; mounting the stator onto a mandrel, the mandrel being constructed to have a fit with an inside of the laminated stator core sized to prevent a flow of the polymeric material between the laminated stator core and the mandrel; inserting the stator into an electrical machine housing mold; molding a polymeric electrical machine housing including a stator band with an integral non-drive end endplate using the polymeric material and the electrical machine housing mold, wherein the molding of the polymeric housing includes overmolding the stator with the winding overhangs within the stator band; inserting a metallic structure into a drive end endplate mold; molding a drive end endplate using the polymeric material and the drive end endplate mold, including forming a plurality of polymeric ribs in the drive end endplate, and including overmolding the metallic structure into the drive end endplate, the metallic structure being constructed to enhance mechanical stiffness of the drive end endplate; installing a rotor assembly into the polymeric electrical machine housing; and installing the drive end endplate onto the polymeric electrical machine housing.

In a refinement, the molding of the polymeric electrical machine housing and the drive end endplate is injection molding the polymeric housing and the drive end endplate using the polymeric material.

In another refinement, the method further comprises inserting a plurality of threaded inserts into the electrical machine housing mold and overmolding the threaded inserts into the stator band.

In yet another refinement, the method further comprises inserting a plurality of metallic anti-creep spacers into the drive end endplate mold; molding attachment openings on the drive end endplate; and overmolding the metallic anti-creep spacers into the attachment openings, wherein the attachment openings and anti-creep spacers are radially and circumferentially aligned with the threaded inserts.

In still another refinement, the method further comprises molding the drive end endplate to include a rabbet, a cavity disposed radially inward of the rabbet and a drain hole open to the cavity and to an outer diameter of the drive end endplate.

In yet still another refinement, the method further comprises forming the metallic structure to include a cylindrical portion and a flange, and forming openings in the flange constructed to receive the polymeric material forming the drive end endplate during overmolding of the metallic structure.

In a further refinement, the method further comprises applying a surface treatment to the metallic structure constructed to reduce defects at the interface between the polymeric material and the metallic structure and to enhance adherence of the polymeric material to the metallic structure.

In a yet further refinement, the method further comprises molding an axial-facing labyrinth seal on the drive end endplate.

In a still further refinement, the method further comprises inserting a plurality of through-hole inserts in the electrical machine housing mold and overmolding the through-hole inserts into the polymeric housing.

Embodiments of the present invention include a method for manufacturing a polymeric electrical machine, comprising: manufacturing a stator including a laminated stator core and a plurality of windings including winding overhangs extending from the laminated stator core; forming a first mold constructed to mold a polymeric electrical machine housing including a stator band with an integral first endplate using a polymeric material; preparing a surface of the laminated stator core to receive an application of a surface treatment; applying the surface treatment to the laminated stator core, the surface treatment being constructed to reduce defects at the interface between the polymeric material and the laminated stator core and to enhance adherence of the polymeric material to the laminated stator core; mounting the stator onto a mandrel, the mandrel being constructed to have a fit with a stator laminated core internal diameter sized to prevent a flow of the polymeric material between the stator internal diameter and the mandrel; inserting the stator into the first mold; molding a polymeric electrical machine housing using the polymeric material, the first mold and the mandrel, including overmolding the stator and stator winding overhangs within the stator band; forming a second mold constructed to mold a second endplate; inserting a bearing sleeve into the second mold; molding the second endplate using the polymeric material and the second mold, including molding plurality of polymeric ribs into the second endplate, and including overmolding the bearing sleeve into the second endplate, the bearing sleeve being constructed to enhance mechanical strength of the second endplate; installing a rotor assembly into the polymeric electrical machine housing; and installing the second endplate onto the polymeric electrical machine housing.

In a refinement, the molding of the polymeric electrical machine housing and the second endplate is injection molding the polymeric electrical machine housing and the second endplate using the polymeric material.

In another refinement, the method further comprises inserting a plurality of threaded inserts into the polymeric housing mold and overmolding the threaded inserts into the stator band.

In yet another refinement, the method further comprises inserting a plurality of metallic anti-creep spacers into the second mold; molding attachment openings on the second endplate; and overmolding the metallic anti-creep spacers into the attachment openings, wherein the attachment openings and anti-creep spacers are circumferentially aligned with the threaded inserts.

In still another refinement, the method further comprises molding the second endplate to include a rabbet, a cavity disposed radially inward of the rabbet and a drain hole open to the cavity and to an outer diameter of the second endplate.

In yet still another refinement, the method further comprises forming the bearing sleeve to include a cylindrical portion and a flange, and forming openings in the flange constructed to receive the polymeric material forming the drive end endplate during overmolding of the bearing sleeve.

In a further refinement, the method further comprises performing surface roughening on an outer surface of the bearing sleeve; and applying a surface treatment to the bearing sleeve constructed to reduce defects at the interface between the polymeric material and the bearing sleeve and to enhance adherence of the polymeric material to the bearing sleeve.

In a yet further refinement, the method further comprises molding an axial-facing labyrinth seal on the second endplate.

In a still further refinement, the method further comprises inserting a plurality of through-hole inserts in the first housing mold and overmolding the through-hole inserts into the polymeric electrical machine housing.

Embodiments of the present invention include a method for manufacturing a polymeric electrical machine, comprising: forming a mold constructed to mold a complete single-piece polymeric electrical machine housing including a stator band with an integral drive end endplate and an integral non-drive end endplate using a polymeric material; inserting a motor assembly into the mold, the motor assembly including a stator, a rotor, a shaft, a plurality of bearings; molding the complete single-piece polymeric electrical machine housing including the stator band with integral drive end endplate and integral non-drive end endplate using the mold and the polymeric material, including overmolding the stator into the stator band.

In a refinement, the method further comprises inserting a drive end molding cup and a non-drive end molding cup onto the motor assembly prior to inserting the motor assembly into the mold, wherein the drive end molding cup and the non-drive end molding cup are constructed to position the stator, the rotor, the shaft and the plurality of bearings prior to the molding of the complete single-piece polymeric electrical machine housing.

In another refinement, the method further comprises molding a fusible core into a motor cavity formed by the stator, the rotor, the shaft and the plurality of bearings, wherein the fusible core is constructed to position the stator, the rotor, the shaft and the plurality of bearings prior to the molding of the complete single-piece polymeric electrical machine housing; and removing the fusible core after the molding of the complete single-piece polymeric electrical machine housing.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A method for manufacturing a polymeric electrical machine, comprising:

manufacturing a stator including a laminated stator core and a plurality of windings including winding overhangs extending from the laminated stator core;

applying a surface treatment to the laminated stator core, the surface treatment being constructed to reduce defects at an interface between a polymeric material and the laminated stator core and enhance adherence between the polymeric material and the laminated stator core;

inserting the stator into an electrical machine housing mold and mounting the stator onto a mandrel of the electrical machine housing mold, the mandrel being constructed to have a fit with an inside of the laminated stator core sized to prevent a flow of the polymeric material between the laminated stator core and the mandrel;

molding a polymeric electrical machine housing including a stator band with an integral non-drive end endplate using the polymeric material and the electrical machine housing mold, wherein the molding of the polymeric electrical machine housing includes overmolding the stator with the winding overhangs within the stator band;

inserting a metallic structure into a drive end endplate mold;

molding a drive end endplate using the polymeric material and the drive end endplate mold, including forming a plurality of polymeric ribs in the drive end endplate, and including overmolding the metallic structure into the drive end endplate, the metallic structure being constructed to enhance mechanical stiffness of the drive end endplate;

installing a rotor assembly into the polymeric electrical machine housing; and installing the drive end endplate onto the polymeric electrical machine housing.

2. The method of claim 1, wherein the molding of the polymeric electrical machine housing and the drive end endplate is injection molding the polymeric housing and the drive end endplate using the polymeric material.

3. The method of claim 1, further comprising inserting a plurality of threaded inserts into the electrical machine housing mold and overmolding the threaded inserts into the stator band.

4. The method of claim 1, further comprising inserting a plurality of metallic anticreep spacers into the drive end endplate mold; molding attachment openings on the drive end endplate; and overmolding the metallic anti-creep spacers into the attachment openings, wherein the attachment openings and anti-creep spacers are radially and circumferentially aligned with threaded inserts.

5. The method of claim 1, further comprising molding the drive end endplate to include a rabbet, a cavity disposed radially inward of the rabbet and a drain hole open to the cavity and to an outer diameter of the drive end endplate.

6. The method of claim 1, further comprising forming the metallic structure to include a cylindrical portion and a flange, and forming openings in the flange constructed to receive the polymeric material forming the drive end endplate during overmolding of the metallic structure.

7. The method of claim 1, further comprising applying a surface treatment to the metallic structure constructed to reduce defects at the interface between the polymeric material and the metallic structure and to enhance adherence of the polymeric material to the metallic structure.

8. The method of claim 1, further comprising molding an axial-facing labyrinth seal on the drive end endplate.

9. The method of claim 1, further comprising inserting a plurality of through-hole inserts in the electrical machine housing mold and overmolding the through-hole inserts into the polymeric housing.

10. The method of claim 1, further comprising:
forming the electrical machine housing mold before said inserting the stator step;
preparing a surface of the laminated stator core to receive an application of a surface treatment before said applying a surface treatment step;
forming the drive end endplate mold before said inserting the metallic structure step;
wherein the metallic structure is a bearing sleeve.

11. The method of claim 10, further comprising performing surface roughening on an outer surface of the bearing sleeve.

12. The method of claim 1, comprising:
forming a mold constructed to mold a complete single-piece polymeric electrical machine housing including the stator band with an integral drive end endplate and an integral non-drive end endplate using a polymeric material in a mold comprising the electrical machine housing mold and the drive end endplate mold;
inserting a motor assembly into the mold, the motor assembly including the stator, and the rotor assembly, a shaft, a plurality of bearings; and
molding the complete single-piece polymeric electrical machine housing including the stator band with the integral drive end endplate and the integral non-drive end endplate using the mold and the polymeric material, including overmolding the stator into the stator band.

13. The method of claim 12, further comprising inserting a drive end molding cup and a non-drive end molding cup onto the motor assembly prior to inserting the motor assembly into the mold, wherein the drive end molding cup and the non-drive end molding cup are constructed to position the stator, and the rotor assembly prior to the molding of the complete single-piece polymeric electrical machine housing.

14. The method of claim 12, further comprising:
molding a fusible core into a motor cavity formed by the stator, and the rotor assembly, wherein the fusible core is constructed to position the stator, and the rotor assembly, prior to the molding of the complete single-piece polymeric electrical machine housing; and
removing the fusible core after the molding of the complete single-piece polymeric electrical machine housing.

* * * * *